United States Patent [19]

Halpin

[11] Patent Number: 4,854,154
[45] Date of Patent: Aug. 8, 1989

[54] APPARATUS AND METHOD FOR DETERMINING THE FLOW CHARACTERISTICS OF A VOLUMETRIC FLOWMETER

[75] Inventor: Michael W. Halpin, Chandler, Ariz.

[73] Assignee: Flow Technology, Inc., Phoenix, Ariz.

[21] Appl. No.: 188,978

[22] Filed: May 2, 1988

[51] Int. Cl.$^4$ .............................................. G01F 25/00
[52] U.S. Cl. .............................................................. 73/3
[58] Field of Search ............................................... 73/3

[56] References Cited

U.S. PATENT DOCUMENTS

| | | | |
|---|---|---|---|
| 3,421,360 | 1/1969 | Luse et al. | 73/3 |
| 3,673,851 | 7/1972 | Wright et al. | 73/3 |
| 3,877,287 | 4/1975 | Duntz, Jr. | 73/3 |
| 4,152,922 | 5/1979 | Francisco, Jr. | 73/3 |
| 4,627,267 | 12/1986 | Cohrs et al. | 73/3 |
| 4,649,734 | 3/1987 | Hillburn | 73/3 |

FOREIGN PATENT DOCUMENTS

| | | | |
|---|---|---|---|
| 163378 | 6/1964 | U.S.S.R. | 73/3 |
| 241037 | 8/1969 | U.S.S.R. | 73/3 |

*Primary Examiner*—Stewart J. Levy
*Assistant Examiner*—Robert R. Raevis
*Attorney, Agent, or Firm*—Christie, Parker & Hale

[57] ABSTRACT

A mechanical displacement flowmeter calibrator has a first fluid line external of the measuring cylinder of the calibrator connected between the inlet and outlet thereof. A flowmeter that produces flow-representative passes is connected in the fluid line. A rod is connected to a measuring piston adapted to travel through the measuring cylinder as a fluid barrier. The rod draws the measuring piston through the measuring cylinder at a predetermined, constant speed and thereby determines the flow rate of the calibration. A reservoir means, connected to the measuring cylinder, is provided which maintains the pressure within the measuring cylinder at a substantially constant value. The displacement of the measuring piston is sensed as it travels through the measuring cylinder during a test run, while the pulses produced by the flowmeter are counted during the time interval in which the piston displaces a given volume. The flowmeter is preferably connected in the fluid line at the pressure null point. The measuring cylinder is preferably provided with a larger second external fluid line connected between the ends of the measuring cylinder. The second external fluid line is provided with a check valve which permits the flow of fluid through the second fluid line when the measuring piston is returned to its starting point at the completion of a test run.

5 Claims, 1 Drawing Sheet

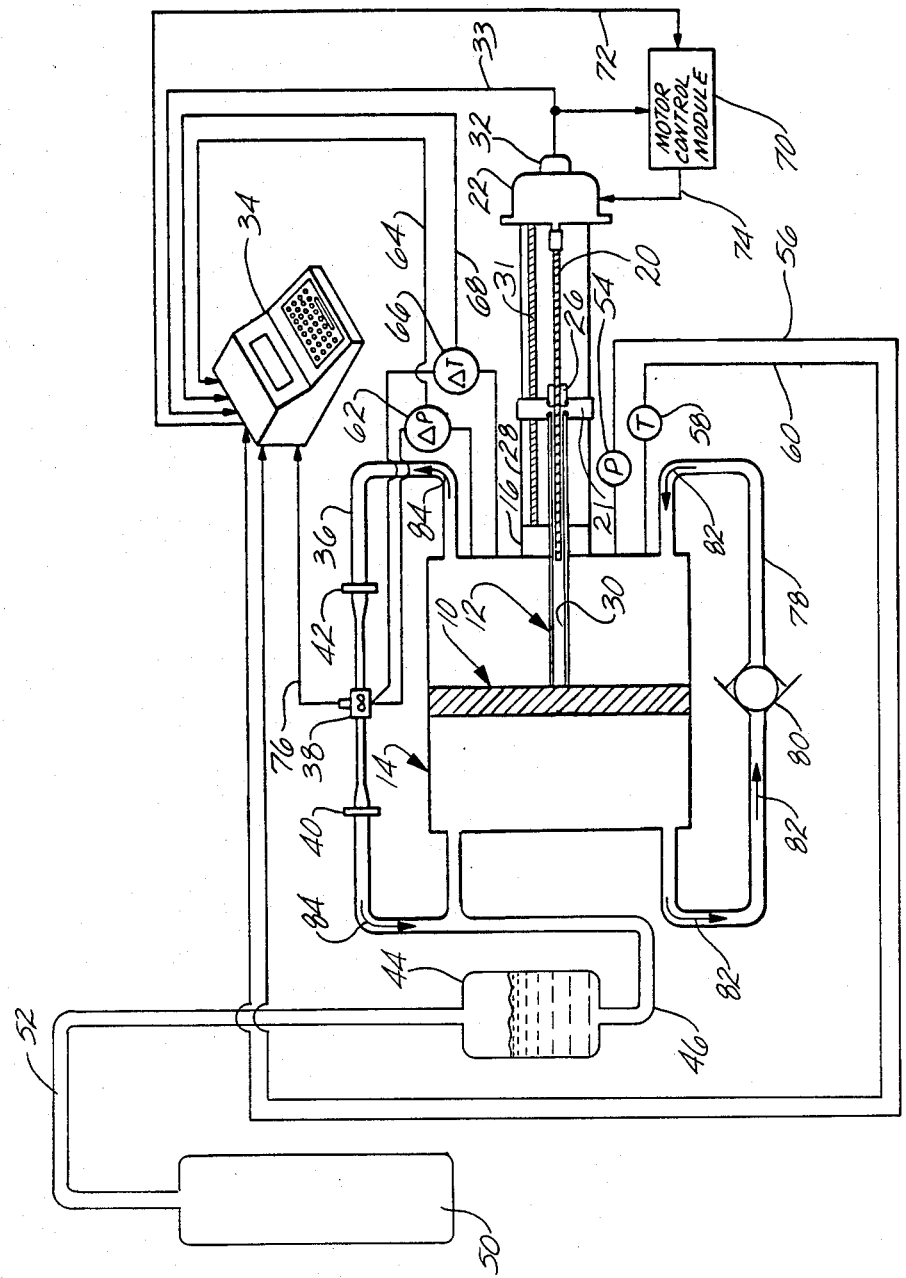

1

APPARATUS AND METHOD FOR DETERMINING THE FLOW CHARACTERISTICS OF A VOLUMETRIC FLOWMETER

FIELD OF THE INVENTION

This invention relates to the measurement of fluid flow and, more particularly, to the determination of the flow characteristics of a flowmeter.

BACKGROUND OF THE INVENTION

In order to obtain accurate readings from a flowmeter, it must be calibrated from time to time by determining its characteristics, i.e., the constant of proportionality between the flow rate of the fluid flowing through the flowmeter and the response given by the flowmeter, sometimes called the K-factor of the flowmeter. In the case of a turbine type flowmeter that develops electrical oscillations proportional in number to the volume of flow through the flowmeter, this characteristic is expressed in terms of the number of pulses generated by the flowmeter per unit volume of fluid passing therethrough. The flowmeter characteristic is a function of the type of fluid, as well as the fluid temperature, pressure, and flow rate, and varies as the parts of the flowmeter wear in the course of use. Apparatus to determine the characteristic of a flowmeter while in an operating fluid system is called a prover. Apparatus to determine the characteristic of a flowmeter in a self-contained system, i.e., not in an operating fluid system, is called a calibrator.

U.S. Pat. No. 4,152,922 discloses a small-volume prover that employs mechanical volume displacement techniques. The prover has a measuring piston that travels through a measuring cylinder as a fluid barrier in synchronism with fluid passing through the operating fluid system that includes the flowmeter under test. A rod connects the measuring piston to a fluidically actuated control piston in a control cylinder which serves to hold the measuring piston at the upstream end of the measuring cylinder between test runs and return the measuring piston to the upstream end of the measuring cylinder after each test runs. When the measuring piston is released at the upstream end of the measuring cylinder to start a test run, the momentum of the fluid flowing through the system rapidly accelerates the measuring piston to the same speed as the fluid flowing through the measuring cylinder, which is representative of the flow rate passing through the flowmeter. The K-factor is determined by counting the number of pulses produced by the flowmeter during the time interval of a given volumetric displacement of the measuring piston.

U.S. Pat. No. 4,627,267 discloses a flowmeter calibrator which has a fluid line external of the measuring cylinder of the calibrator connected between the inlet and outlet thereof. A flowmeter is connected in the fluid line at a pressure null point so as to maintain the pressure of the fluid passing through the flowmeter at a predetermined constant value. A rod is connected to a measuring piston adapted to travel through the measuring cylinder as a fluid barrier. The rod drives the measuring piston through the measuring cylinder at a predetermined, constant speed and thereby determines the flow rate of the calibration. The displacement of the measuring piston is sensed as it travels through the measuring cylinder during a test run, while the pulses produced by the flowmeter are counted during the time interval in which the piston displaces a given volume. Because the calibrator has a small fixed volume, the pressure and temperature of the fluid passing through the flowmeter can be closely controlled, and any type of test fluid can be used irrespective of cost. Thus, the pressure, temperature, and type of test fluid can be selected so as to duplicate the actual conditions of the flowmeter in its operating system. Moreover, the flow rate can be closely controlled by regulating the driving speed of the rod.

In U.S. Pat. No. 4,627,267, the driving rod extends through both ends of the measuring cylinder, thereby adding to the overall size of the calibrator, and is pushed as it is driven during a test run.

SUMMARY OF THE INVENTION

According to the present invention, a mechanical positive displacement flowmeter calibrator has a fluid line external of the measuring cylinder of the calibrator connected between the inlet and outlet thereof. A flowmeter to be calibrated is connected in the fluid line. Preferably, a rod is connected to a measuring piston adapted to travel through the measuring cylinder. The rod displaces the measuring piston through the measuring cylinder at a predetermined, constant speed, and thereby determines the flow rate. It is preferred that the measuring piston is drawn, rather than pushed, through the measuring cylinder by the rod, as this places the rod under tension, rather than in compression. The displacement of the measuring piston is sensed as it travels through the measuring cylinder during a test run, while the pulses produced by the flowmeter are counted during the time interval in which the piston displaces a given volume.

The flowmeter calibrator of the present invention is also provided with a reservoir means which is capable of receiving test fluid from, or supplying test fluid to, the measuring cylinder, in response to displacement of the measuring piston. The reservoir means preferably also functions to maintain the pressure in the measuring cylinder substantially constant.

The provision of a reservoir means enables the use of a rod connected to the measuring piston, which does not extend through both ends of the measuring cylinder. This results in the overall space required for the calibrator to be decreased. If the test fluid is liquid, the reservoir means preferably has a gas-filled region overlying the test liquid in the reservoir means. The volume of the gas region is substantially larger than the change in liquid volume in the reservoir means, which maintains the pressure in the measuring cylinder substantially constant.

Preferably, there is also another external fluid line connected between the inlet and outlet of the calibrator to facilitate piston return after a test run. A check valve mounted in the other line closes during a test run and opens during piston return.

BRIEF DESCRIPTION OF THE DRAWINGS

The features of a specific embodiment of the best mode contemplated of carrying out the invention are illustrated in the drawing, the single figure of which is a schematic diagram of a calibrator incorporating principles of the invention.

DETAILED DESCRIPTION OF THE SPECIFIC EMBODIMENT

In FIG. 1, a measuring piston 10 connected, to only one side of 12 is adapted to travel through a measuring cylinder 14 from end-to-end. A seal housing 16 is mounted on the downstream end of measuring cylinder 14. Rod 12 passes through seal housing 16 to the exterior of cylinder 14. Measuring piston 10 travels through measuring cylinder 14 as a fluid barrier.

In the embodiment shown in FIG. 1, measuring piston 10 is driven mechanically; however, it is within the scope of the present invention to drive piston 10 fluidically as described in U.S. Pat. No. 4,627,267.

The disclosure of this patent is incorporated fully herein by references. Specifically, as shown in FIG. 1, a threaded shaft 20 is rotatably driven by a motor 22. The threads of shaft 20 engage threads at 26 on a translatable, non-rotatable carriage 21, which is fixedly mounted on the downstream end of rod 12. Carriage 21 rides on rails 28. The upstream end of rod 12 has a bore 30 that receives a portion of shaft 20 extending beyond the threaded engagement at 26. A linear optical encoder 31 is preferably coupled to carriage 21, to serve as a measuring piston displacement sensor. Linear encoder 31 could be constructed as described in U.S. Pat. No. 4,627,267. The output of linear encoder 31 is connected to a control console 34 by an electrical cable 33. A rotary encoder 32 is connected to shaft 20. Its output is coupled to console 34 and a motor control module 70.

Measuring cylinder 14 has an inlet at one end and an outlet at the other end connected externally by a fluid line 36. Preferably, line 36 approximately follows the shortest path between the inlet and outlet of measuring cylinder 14, as shown, to minimize space requirements. A flowmeter 38 to be calibrated, such as a turbine meter, is connected in fluid line 36. Fluid line 36 has fittings 40 and 42, which permits the installation of different flowmeters for calibration purposes. In any case, to ensure stable flow of the test liquid in the flowmeter under test, the distance between fittings 40 and 42 is about 30 times the diameter of the section of the fluid line therebetween, which depends on the flow rate of the flowmeter under test.

As rod 12 moves into and out of measuring cylinder 14, the free volume therein changes. A reservoir means or test liquid accumulator 44 is connected to fluid line 36 by way of a line 46 to receive and discharge test fluid as the free volume in measuring cylinder 14 changes due to rod 12. A plenum chamber 50 is connected by a line 52 to the top of reservoir means 44. The plenum chamber 50 has a much larger volume, i.e., 20 times or more, than the change in test liquid volume in reservoir means 44, and is charged with a pressurized gas to maintain a constant force on the surface of the test liquid.

The output of a pressure transducer 54, which senses the pressure in measuring cylinder 14, is connected to console 34 by an electrical cable 56. The output of a temperature transducer 58, which senses the temperature of the fluid in the measuring cylinder 14, is connected to console 34 by an electrical cable 60. A $\Delta P$ transmitter 62, which senses the fluid pressure difference between the flowmeter 38 and the measuring cylinder 14, is connected to console 34 by an electrical cable 64. $\Delta T$ transducer 66, which senses the fluid temperature difference between flowmeter 38 and measuring cylinder 14, is connected to console 34 by an electrical cable 68. Electronics in console 34 selects a rate control signal, which is applied to motor control module 70 by an electrical cable 72. Motor control module 70 derives an actuating voltage for motor 22 responsive to the selected rate control signal from console 34 and an actual rate signal derived from rotary encoder 32. This actuating signal is applied to the actuating winding of motor 22 by an electrical cable 74. As a result, motor 22 drives measuring piston 10 at a predetermined constant speed from the upstream end to the downstream end of measuring cylinder 14 in the course of a test run to produce from linear encoder 31 and flowmeter 38 the data for deriving the K-factor of flowmeter 38 in console 34.

Another fluid line 78 is connected external of measuring cylinder 14 between its ends to facilitate piston return after a test run. Installed in fluid line 78 is a check valve 80. Check valve 80 could be Model No. 316D-18 of Kepner Products Company, Villa Park, Ill. Check valve 80 functions to allow flow of that liquid through fluid line 78 in the direction indicated arrows 82. Line 78 preferably has a much larger diameter and a much shorter developed length than line 36, so that most of the fluid passes therethrough when measuring piston 10 is returned to the upstream end of measuring cylinder 14 at the end of a test run. During a test run, test liquid flows through line 36, and line 78 is blocked by check valve 80. When linear encoder 31 detects the arrival of measuring piston 10 at the downstream end of measuring cylinder 14, motor 22 drives measuring piston 10 back to the upstream end of measuring cylinder 14 in preparation for another test run. The upstream displacement of piston 10 opens check output of linear encoder 31 is also connected to motor is at the upstream or downstream end of measuring cylinder 14.

In operation, a test run begins with measuring piston 10 at the upstream end of measuring cylinder 14 and non-rotatable carriage 21 at the upstream end of rails 28 (extreme left position as viewed in FIG. 1). Upon actuation of motor 22, threaded shaft 20 is rotated and non-rotatable carriage 24 is drawn toward the downstream end of rails 28. As a result, measuring piston 10 is drawn through the measuring cylinder 14 from left to right with threaded shaft 20 under tension (as viewed in FIG. 1). The displacement of measuring piston causes flow from measuring cylinder 14 through flowmeter 38 in the direction indicated by arrows 84. As the measuring piston displaces a given volume in measuring cylinder 14, the number of pulses generated by flowmeter 38 is counted. The result in volume per pulse is the K-factor of flowmeter 38. Preferably, the double chronometry technique described in U.S. Pat. No. 3,403,544 is employed to make this count.

As will be apparent, in the passage of measuring piston 10 through measuring cylinder 14, the free volume in measuring cylinder 14 is increased due to the removal of rod 12 from the measuring cylinder. The increased volume is filled by fluid from reservoir means 44. In addition, due to the large volume of plenum chamber 50, including the space above the test liquid in reservoir means 44, the pressure exerted on the test fluid remains substantially the same as test fluid is exchanged between measuring cylinder 14 and reservoir means 44.

The described embodiment of the invention is only considered to be preferred and illustrative of the inventive concept; the scope of the invention is not restricted to such embodiment. Various and numerous other arrangements may be devised by one skilled in the art without departing from the spirit and scope of this invention. Although the invention can be used to particular advantage to calibrate turbined meters or other volumetric flowmeters, it can also be used to calibrate other types of flowmeters.

What is claimed is:

1. A flowmeter calibrator comprising:

a fluid displacement measuring cylinder having at its respective ends an inlet and an outlet;

a fluid displacement measuring piston adapted to travel through the measuring cylinder as a fluid barrier;

a rod connected to only one side of the piston and extending only from the one side of the piston to the exterior of the measuring cylinder;

means external to the measuring cylinder for displacing the rod to drive the measuring piston through the measuring cylinder thereby inducing fluid flow during a test run;

reservoir means connected to the measuring cylinder, the reservoir means being capable of receiving fluid from or supplying fluid to the measuring cylinder in response to changes in the free volume of the measuring cylinder caused by displacement of the rod as the measuring piston is driven through the measuring cylinder;

means for sensing the displacement of the measuring piston as it is driven through the measuring cylinder;

a fluid line external of the measuring cylinder connected between the inlet and outlet thereof to form a closed loop; and a flowmeter connected in the fluid line.

2. A flowmeter calibrator as claimed in claim 1, additionally comprising means for maintaining the fluid pressure in the reservoir means substantially constant during displacement of the rod as the measuring piston is driven through the measuring cylinder.

3. A flowmeter calibrator as claimed in claim 2, in which the maintaining means comprises a gas charged plenum chamber having a volume substantially greater than the change in volume of fluid in the reservoir during displacement of the rod as the measuring piston is driven through the measuring cylinder.

4. A flowmeter calibrator as claimed in claim 1 in which the measuring piston is drawn through the measuring cylinder during a test run.

5. A flowmeter calibrator as claimed in claim 1 further comprising a second fluid line external of the measuring cylinder connected between its ends, the second fluid line having a check valve positioned therein so as to enable the passage of fluid through the second fluid line during return of the measuring piston to its starting position at the completion of a test run and to block the passage of fluid through the second fluid line during a test run.

* * * * *